(12) United States Patent
Fattori

(10) Patent No.: US 10,821,642 B2
(45) Date of Patent: Nov. 3, 2020

(54) INJECTION NOZZLE FOR AN INJECTION MOLDING MACHINE

(71) Applicant: Injection Mold Consulting, LLC, Trevose, PA (US)

(72) Inventor: James Gary Fattori, Trevose, PA (US)

(73) Assignee: Injection Mold Consulting, LLC, Trevose, PA (US)

( * ) Notice: Subject to any disclaimer, the term of this patent is extended or adjusted under 35 U.S.C. 154(b) by 216 days.

(21) Appl. No.: 16/022,692

(22) Filed: Jun. 29, 2018

(65) Prior Publication Data

US 2018/0304506 A1  Oct. 25, 2018

Related U.S. Application Data

(63) Continuation-in-part of application No. 15/189,492, filed on Jun. 22, 2016, now abandoned.
(Continued)

(51) Int. Cl.
*B29C 45/20* (2006.01)
*B29C 45/03* (2006.01)
(Continued)

(52) U.S. Cl.
CPC .............. *B29C 45/20* (2013.01); *B29C 45/03* (2013.01); *B29C 45/278* (2013.01);
(Continued)

(58) Field of Classification Search
CPC ....... B29C 45/20; B29C 45/03; B29C 45/278; B29C 2045/2759; B29C 2045/2766; B29C 45/2806; B29C 2045/2785; B29C 45/2737; B29C 2045/2761; B29C 45/2735; B29C 2045/2724
See application file for complete search history.

(56) References Cited

U.S. PATENT DOCUMENTS 2,253,627 A   8/1941  Kowles
2,747,226 A   5/1956  Schnitzius et al.
(Continued)

FOREIGN PATENT DOCUMENTS

CN   104002428   8/2014
JP   5309695    11/1993
(Continued)

*Primary Examiner* — Joseph S Del Sole
*Assistant Examiner* — Mohamed K Ahmed Ali
(74) *Attorney, Agent, or Firm* — LaMorte & Associates P.C.

(57) ABSTRACT

An injection nozzle for use in an injection molding machine. The injection nozzle has a nozzle body. The nozzle body has a tip section, a nut section, a threaded section that are interposed between a first end and a second end. A conduit extends through the nozzle body between an intake orifice and an output orifice. Within the nozzle body, the conduit has a first zone and a second zone that meet at a transition area. The first zone extends into the nozzle body from the first end. The second zone extends into the nozzle body from the second end. Fins radially extend into the first zone of the conduit. The fins absorb heat from material passing through the first zone of the conduit. The fins can cause molten material to cool quicker in the first zone of the conduit than in the second zone of the conduit.

16 Claims, 10 Drawing Sheets

Related U.S. Application Data

(60) Provisional application No. 62/212,360, filed on Aug. 31, 2015.

(51) Int. Cl.
    *B29C 45/27*     (2006.01)
    *B29K 101/12*     (2006.01)
    *B29K 27/06*     (2006.01)

(52) U.S. Cl.
    CPC .... *B29C 2045/207* (2013.01); *B29K 2027/06* (2013.01); *B29K 2101/12* (2013.01)

(56) References Cited

U.S. PATENT DOCUMENTS

| | | |
|---|---|---|
| 4,015,916 A | 4/1977 | Sokolow |
| 4,069,003 A | 1/1978 | Cecchi |
| 4,450,999 A | 5/1984 | Gellert |
| 4,902,218 A | 2/1990 | Leonard et al. |
| 5,028,227 A | 7/1991 | Gellert et al. |
| 5,055,028 A | 10/1991 | Trakas |
| 5,340,303 A | 8/1994 | Maus et al. |
| 5,505,613 A | 4/1996 | Krummenacher |
| 5,516,275 A | 5/1996 | Watanuki |
| 5,727,739 A | 3/1998 | Hamilton |
| 5,849,343 A | 12/1998 | Gellert |
| 6,089,468 A | 7/2000 | Bouti |
| 6,135,757 A | 10/2000 | Jenko |
| 6,419,116 B1 | 7/2002 | Eigler et al. |
| 6,604,933 B1 | 8/2003 | Kern |
| 6,712,597 B1 | 3/2004 | Van Boekel |
| 6,769,901 B2 | 8/2004 | Babler |
| 7,137,807 B2 | 11/2006 | Babin et al. |
| 7,175,416 B2 | 2/2007 | Baresich |
| 7,238,019 B2 | 7/2007 | Schwenk |
| 7,507,081 B2 | 3/2009 | Guenther |
| 7,785,099 B2 | 8/2010 | Sakaki |
| 8,062,025 B2 | 11/2011 | Klobucar et al. |
| 2004/0137107 A1* | 7/2004 | Babin ............... B22D 17/2272 425/572 |
| 2008/0260889 A1 | 10/2008 | Jenko et al. |
| 2013/0095265 A1 | 4/2013 | Mitadera |

FOREIGN PATENT DOCUMENTS

| | | |
|---|---|---|
| JP | 2001145944 | 5/2001 |
| JP | 2001225359 | 8/2001 |
| JP | 200311176 | 1/2003 |
| JP | 200371873 | 3/2003 |

\* cited by examiner

INJECTION NOZZLE FOR AN INJECTION MOLDING MACHINE

RELATED APPLICATIONS

This application is a continuation-in-part of U.S. patent application Ser. No. 15/189,492, filed Jun. 22, 2016, which claims the priority of U.S. Provisional Patent Application No. 62/212,360, filed Aug. 31, 2015.

BACKGROUND OF THE INVENTION

1. Field of the Invention

In general, the present invention relates to injection nozzles that are used as parts of injection molding machines. More particularly, the present invention relates to the structure of injection nozzles and the internal features that enhance the performance of injection nozzles.

2. Prior Art Description

Injection molding is a well know process that involves injecting molten material into a mold. Typically, injection molding utilizes a thermoplastic molding material. The thermoplastic material is loaded into the heated barrel of an injection molding machine.

Within the injection molding machine, the heated barrel is mounted on a moveable carriage. During the molding cycle, the heated barrel is moved on the carriage and is brought into contact with a mold. The molten material is then injected into the mold, wherein the molten material fills one or more mold cavities. Within the mold, the molding material takes on the shape of the cavity as it solidifies. The mold then opens to eject the finished part. After the finished part is ejected, the mold closes, and the process is repeated until a desired number of parts are created.

During the molding cycle, the heated barrel that holds the molten material is constantly in contact with the mold. Furthermore, when in contact, the heated barrel transfers molten material into the mold under high pressure. In order to transfer the molten material between the heated barrel and the mold, there is an abutment connection that enables the molten material to travel from the heated barrel into the mold. The abutment connection typically is created using a shaped injection nozzle that seats into a sprue bushing. Referring to FIG. 1 in conjunction with FIG. 2 and FIG. 3, a traditional abutment connection 10 is shown that contains a prior art injection nozzle 12 and a prior art sprue bushing 14. The prior art injection nozzle 12 has a threaded body 16 and an enlarged head 18. The threaded body 16 screws into the heated barrel of the injection molding machine. The enlarged head 18 is used as the nut to tighten and loosen the prior art injection nozzle 12. The enlarged head 18 also has a convex surface 20 that faces the prior art sprue bushing 14. The convex surface 20 is typically smooth or highly polished. The injection nozzle 12 also defines an internal conduit 22 that exits the injection nozzle 12 at the crown of the convex surface 20.

The injection nozzle 12 abuts against the sprue bushing 14 during the operation of the injection molding machine. The sprue bushing 14 has a concave receptacle 24 that receives the enlarged head 18 of the injection nozzle 12. The curvature of the convex surface 20 and the concave receptacle 24 are matched to ensure that there are no significant gaps between the surfaces through which molten material can escape. An intake conduit 26 is formed through the sprue bushing 14 that leads into the mold through a truncated conical shape which forms a molded sprue 28. The diameter of the internal conduit within the injection nozzle 12 is often selected to match the size of the intake conduit 26 that passes through the sprue bushing 14. However, the injection nozzle 12 does not always perfectly align with the sprue bushing 14 as the injection molding machine cycles. Any slight misalignment can cause a restriction in the flow pathway of the molten material. Any restriction would raise the pressure of the molten material. If the pressure becomes too high, a blowback condition can occur where back pressure causes the injection nozzle 12 to separate from the sprue bushing 14. This creates a gap through which the pressurized molten material can escape before reaching the mold. However, even if a blowback condition does not occur, a misalignment between the injection nozzle 12 and the sprue bushing 14 also results in a reduced flow area that generates more shear in the flowing material and creates an undercut condition which can prevent the removal of the sprue 28. To reduce the problems created by misalignment between the injection nozzle 12 and the sprue bushing 14, it has become common practice to use an injection nozzle 12 with an exit orifice that is at least 1/32 inch smaller in diameter than the intake conduit 26 of the sprue bushing 14.

The thermoplastic material 30 that flows from the injection nozzle 12 to the sprue bushing 14 is initially hot, molten and under pressure. However, during the stages of the injection molding process, the thermoplastic material 30 becomes semi-solid and eventually solid. When an injection molding machine is being rapidly cycled, it is not unusual for the thermoplastic material 30 to be molten, semi-molten and solid at the same time within the confines of the injection nozzle 12 and the sprue bushing 14. The composition of the thermoplastic material 30 being molded greatly affects the physical state of the material. Crystalline thermoplastic materials will typically have a small amount of semi-molten material between the molten material and solid material. Amorphous thermoplastic materials typically contain a considerably larger percentage of semi-molten material between the molten material and solid material. Control of these three physical states and their location within the injection nozzle is critical to the performance of the molding process. It is for this reason that many molds are designed with heated sprue bushings and heated runners, to better control the temperature of the thermoplastic material as it flows into the mold.

As is seen in FIG. 3, the thermoplastic material 30 does not always perform in a desirable manner. Rather, there are some molten material or semi-molten material in the sprue 28 when the mold opens and the sprue 28 separates from the injection nozzle 12. The molten or semi-molten thermoplastic material 30 is exposed to the ambient environment and hardens. The result is a runner of material or string 32 that extends from the injection nozzle 12 and the solidified sprue 28. The length of these strings 32 may range from a fraction of an inch to several feet long.

A string 32 typically originates from the cross-sectional center of the injection nozzle 12, where the thermoplastic material 30 is often still molten at the end of the molding cycle. As the outer surface of the molten material solidifies, it insulates the center section and causes the center to solidify at a slower rate. As the thermoplastic material 30 continues to cool, it shrinks away from the surfaces of the injection nozzle 12. This results in a further reduction of thermal conductivity, slowing down solidification. A string 32 will often form when the cycle time of the mold is less than the time required for the thermoplastic material 30 within the passage of the injection nozzle 12 to solidify.

Particularly long strings 32 may drape and adhere to the parting line or the face of the open mold. This adherence is aided by static electricity between the strings and the parting line. When the mold closes to start the next cycle, the strings are compacted under great pressure. The presence of the strings can damage the parting line, which can be expensive to repair. The strings are also very long and thin. As such, they often drape over the mold when the mold is open. As the mold closes, the presence of the strings can damage the mold and cause aesthetically unacceptable flaws in the molded parts.

One method used to control the creations of strings in an injection molding machine is to extend the cycle time. This provides additional time for the thermoplastic material within the injection nozzle to solidify. This method reduces efficiency and increases the costs of the molded parts.

Another method commonly used to eliminate the creation of strings is to employ an injection nozzle with a reduced internal diameter. The thermoplastic material within the smaller diameter passage will harden quicker. However, the thermoplastic material within the injection nozzle may solidify before the molded part has solidified. This disrupts the molding cycle. Furthermore, using a smaller diameter injection nozzle can cause other problems, such as higher injection pressures, high shear rates and material degradation.

The internal geometry of the injection nozzle has a direct effect on the molding process and the quality and cost of the molded part. In the prior art, injection nozzles have been made in a variety of shapes and configuration, including injection nozzles that have conduits with truncated conical shapes. Such prior art is exemplified by U.S. Pat. No. 6,604,933, to Kern. Truncated conical shapes are a compromise between a conduit with a large diameter and a conduit with a small diameter. However, as the diameter of the conduit decreases, the corresponding flow area decreases. This, in turn, increases the required injection pressure to fill the molding cavity. Insufficient injection pressure may result in parts having a wavy surface finish, internal voids, incomplete filling known as shorts, variation in weight and dimension, and other unacceptable conditions.

Additionally, as the diameter of the passageway decreases, the amount of heat generated by frictional shear increases, reducing the viscosity of the material, which can cause the thermoplastic material to flow into extremely thin crevices, resulting in additional unwanted material called "flash." Excessive shear heat can cause the material to degrade and burn, which can have a negative effect on both the aesthetic and physical properties of the molded part. This degradation can also cause the mold to become stained, which would require expensive cleaning and polishing in order to produce an acceptable part.

Since the distal end of the injection nozzle is connected to the heated barrel assembly, and the proximal end of the injection nozzle contacts the colder injection mold, there is a large temperature differential within the structure of the injection nozzle. Controlling the distribution and location of this temperature differential is important for controlling the injection molding process. Heat transfer via conduction between the injection nozzle and the sprue bushing often is greater than desired. This conduction cools the injection nozzle and can cause some thermoplastic material to solidify within the injection nozzle. The solidified material in the injection nozzle is known as a "cold slug." Upon the start of the next molding cycle, tremendous injection pressure is required to dislodge the cold slug inside the injection nozzle and inject it into the mold. Once dislodged, the cold slug can travel through the mold passageways and into the mold cavity, resulting in undesirable marks on the molded part, typically referred to in the industry as "splay."

Many cold slugs are not completely solid, but may be semi-rigid and highly viscous, like putty. The viscous slug of molding material is often either pulled out with the solidified molded sprue, or it breaks off from the sprue and remains within the passageway of the injection nozzle. It is not uncommon for the cold slug to randomly alternate between the two scenarios. This condition causes a variation in the amount of material injected into the mold, which is referred to as the "shot size." When molding a small part, this variation in shot size can cause the molded part to contain an insufficient or an excessive amount of material and can vary from cycle to cycle. Therefore, it is beneficial to have an injection nozzle that promotes a distinct and repeatable separation point between the solidified sprue and the molten or semi-molten material in the injection nozzle.

Molders often increase the temperature of the heated barrel assembly, particularly near the injection nozzle, to prevent cold slugs from forming. However, this increase in temperature can cause the thermoplastic material to degrade, particularly if the thermoplastic material is temperature or shear sensitive, such as is the case with Polyvinyl Chloride (PVC). Many reground and recycled materials are also shear sensitive, due to the reduction of lubricating and heat stabilizing additives from prior molding cycles. Since material degradation is not always visible on the surface of a part, it is beneficial to have an injection nozzle that minimizes shear to prevent degradation and permit the use of reground and recycled material without jeopardizing the quality of the molded part.

Since most thermoplastic materials expand when heated, excessive temperatures can also cause small amounts of molten material to extrude out of the proximal opening of the injection nozzle, which is often referred to as "drool." Insulating material can be used to reduce the thermal conductivity between the injection nozzle and sprue bushing. These insulators can work well in some cases, such as with small orifice diameters, but are difficult and troublesome to use in a production environment, and are very ineffective on large orifice diameters, such as those greater than ¼ inch in diameter.

There is a temperature range at which injection nozzles can be set and will be hot enough not to create cold slugs, yet cold enough to avoid drool or degradation of the thermoplastic material. This temperature range can be very wide or very narrow depending on many factors. The factors include the type and design of the injection nozzle, the size of the passage within the injection nozzle, the type of thermoplastic molding material, the amount of conductive heat loss, the cycle time, and the injection flow rate. Ideally, the molding process parameters should be established to produce a quality molded part, and not established to prevent strings, cold slugs or freeze offs.

As will later be described, the improved injection nozzle of the present invention utilizes internal fins to help regulate heat flow. The use of internal fins in injection nozzles is unique. However, fins have been used in injection valves, albeit for different purposes. Injection valves are pin valves that can control the flow of molten plastic into different parts of a mold. The injection valve has an output orifice that is obstructed by a pin. The pin can be retracted to different degrees to selectively control the flow of molten material through the valve. Injection valves have internal fins that are used exclusively to guide the reciprocal movement of the pin. As such, the fins are always aligned to be parallel with the pin and are not shaped, positioned or otherwise designed for any purpose other than pin guidance. Prior art injection valves with internal guidance fins are exemplified by U.S. Pat. No. 5,849,343 to Gellert and U.S. Pat. No. 6,089,468 to Bouti.

In view of the above, a need exists in the art for an improved nozzle that minimizes the production of strings and flash without adversely affecting the cycle efficiency of the injection molding machinery or affecting the quality of the molded pieces. This need is met by the present invention as described and claimed below.

SUMMARY OF THE INVENTION

The present invention is an improved injection nozzle for use in an injection molding machine. The injection nozzle has a nozzle body. The nozzle body has a first end and an opposite second end, wherein the nozzle body is symmetrically disposed around a center axis that extends through the first end and the second end. The nozzle body has a tip section, a nut section, a threaded section that are interposed between the first end and the second end.

An output orifice of a first diameter is disposed at the first end of the body. The orifice is concentric with the center axis. An intake orifice of a second diameter is disposed at the second end of the body. The second diameter of the intake orifice is larger than the first diameter of the output orifice. The intake orifice is also concentric with said center axis.

A conduit extends through the nozzle body between the intake orifice and the output orifice. Within the nozzle body, the conduit has a first zone and a second zone that meet at a transition area. The first zone of the conduit extends into the nozzle body from the first end. The second zone of the conduit extends into the nozzle body from the second end. The output orifice is the widest part of the first zone.

A plurality of fins radially extend into the first zone of the conduit toward the center axis from the nozzle body. The fins absorb heat from material passing through the first zone of the conduit. In this manner, the fins can cause molten material to cool quicker in the first zone of the conduit than in the second zone of the conduit. As a result, a consistent and clean separation can be created in the molded material at the transition area between the first zone and the second zone. The invention can also be practices by using a second set of fins in the second zone of the conduit. The second set of fins can help keep the thermoplastic material hot in the second zone, while the first set of fins helps cools the thermoplastic material in the first zone.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention injection nozzle and abutment connection can be adapted for use in many styles and models of injection molding machines, only two exemplary embodiments are described. The exemplary embodiments are selected in order to set forth some of the best modes contemplated for the invention. The illustrated embodiments, however, are merely exemplary and should not be considered limitations when interpreting the scope of the appended claims.

Figure 1:
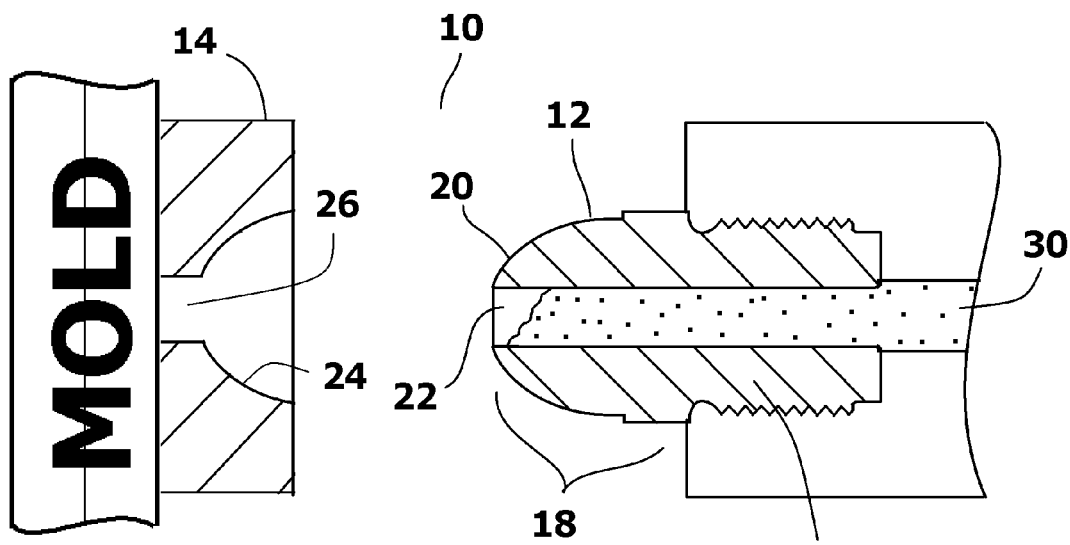
FIG. 1 is a cross-sectional view of a prior art abutment connection within an injection molding machine between an injection nozzle and a sprue bushing, wherein the abutment connection is shown disengaged.
Figure 2:
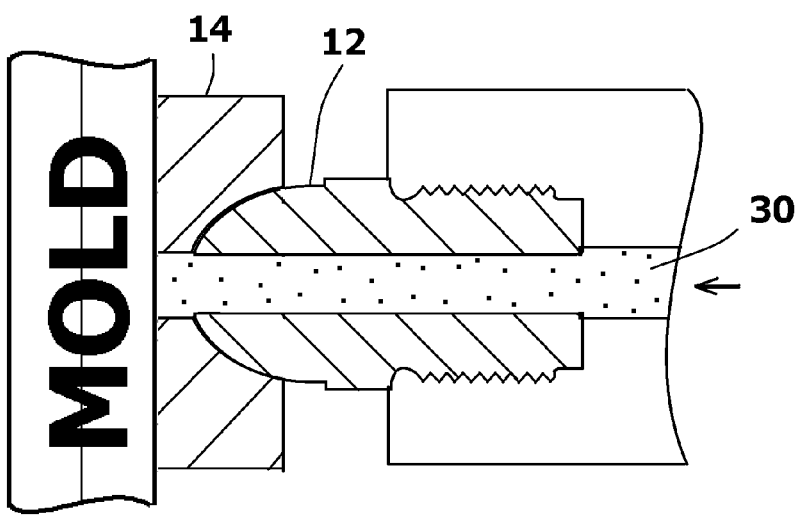
FIG. 2 shows the prior art abutment connection of FIG. 1 shown in the middle of a molding cycle.
Figure 3:
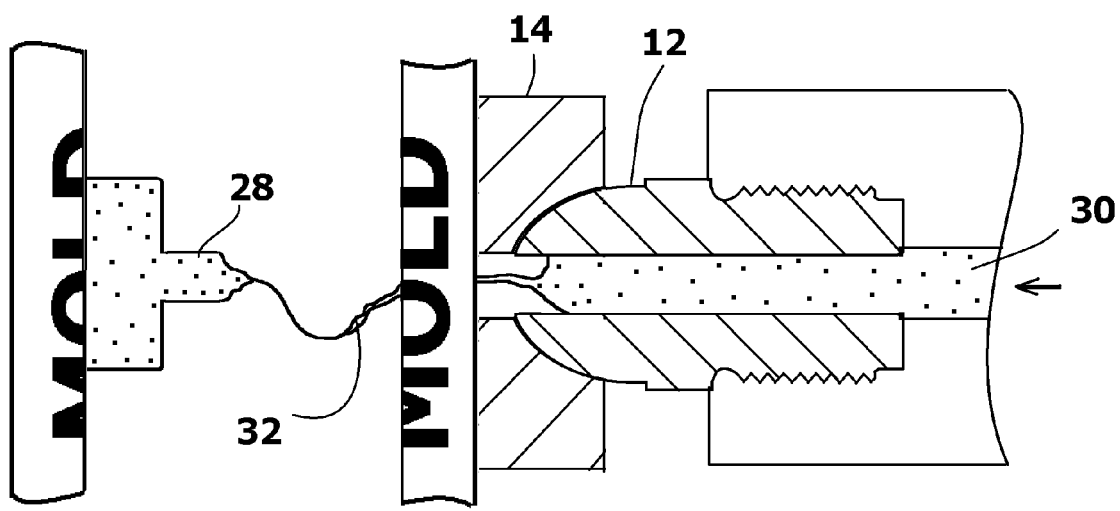
FIG. 3 shows the prior art abutment connection of FIG. 2 forming a string at the end of a molding cycle.
Figure 4:
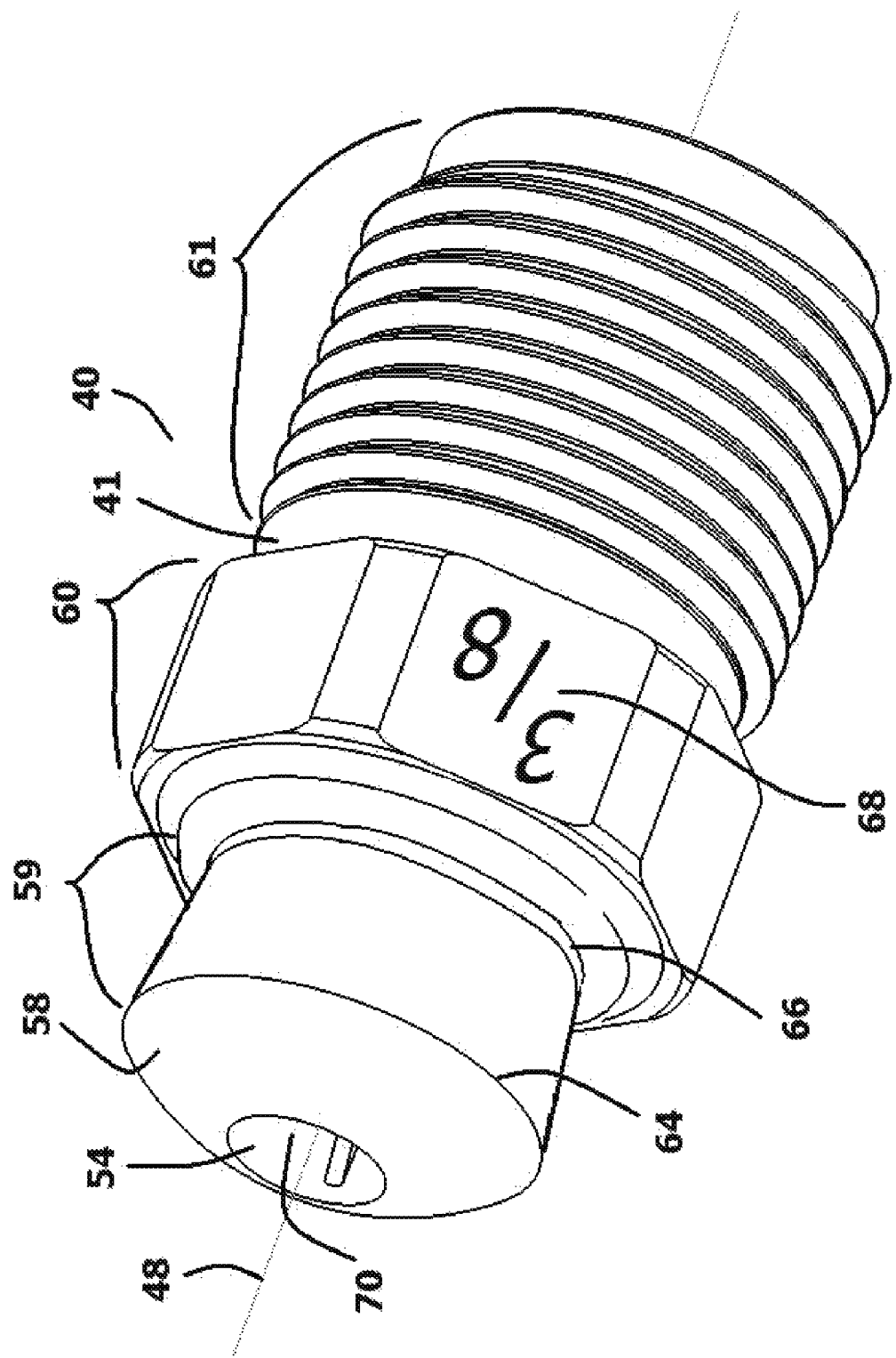
FIG. 4 shows a perspective view of an exemplary embodiment of an injection nozzle.
Figure 5:
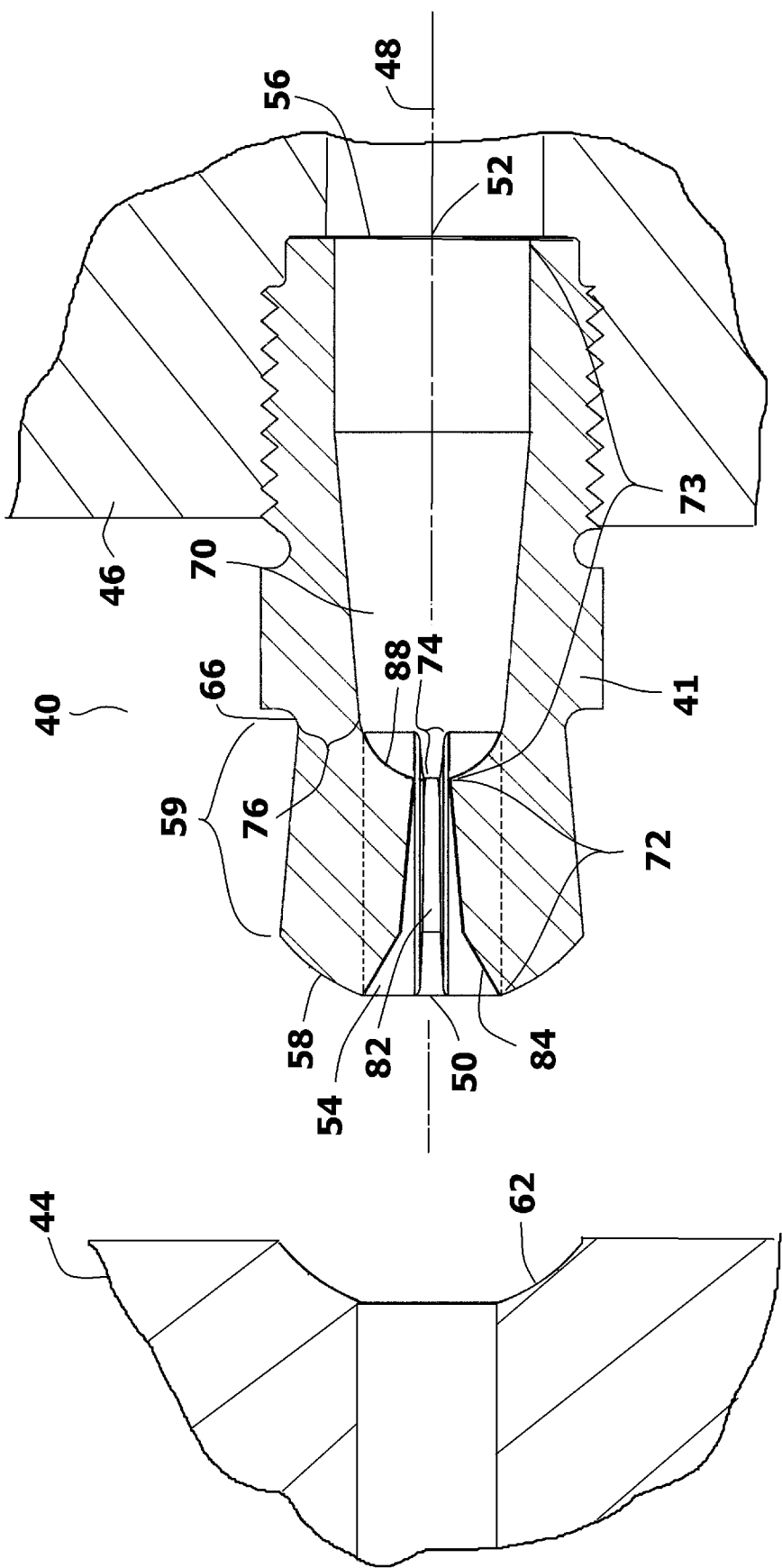
FIG. 5 shows a cross-sectional view of the exemplary embodiment of FIG. 4.

Referring to FIG. 4 in conjunction with FIG. 5, an improved injection nozzle 40 is shown, for use in an abutment connection 42 between a mold 44 and the heated injection barrel 46 of an injection molding machine. The injection nozzle 40 has a nozzle body 41 that is machined of metal. The nozzle body 41 is symmetrically disposed around an imaginary center axis 48. The nozzle body 41 has a first end 50 and an opposite second end 52. An output orifice 54 is disposed at the first end 50. Conversely, in intake orifice 56 is disposed at the second end 52. Both the output orifice 54 and the intake orifice 56 are concentric with the center axis 48 and extend in parallel planes that are perpendicular to the center axis 48.

Progressing along the center axis 48 from the first end 50 to the second end 52, the nozzle body 41 has a curved contact surface 58, a tip section 59, a nut section 60 and a threaded section 61. The curved contact surface 58 radially extends from the periphery of the output orifice 54. The curved contact surface 58 has a radius of curvature that matches the radius of curvature used on the sprue bushing 62. The curved contact surface 58 can be machined smooth. However, for a purpose that will later be described, the curved contact surface 58 is preferably slightly textured.

The curved contact surface 58 extends to a first transition line 64. At the first transition line 64, the tip section 59 of the nozzle body 41 begins. The tip section 59 extends to the nut section 60. The tip section 59 decreases in diameter as it extends away from the transition line 64. As such, no part of the tip section 59 has a larger diameter than does the curved contact surface 58 at the transition line 64. The decreasing diameter of the tip section 59 minimizes the mass of the tip section 59 and creates a low point 66 on the exterior of the nozzle body 41.

The nut section 60 has an exterior that is shaped as a hex-nut, or a similar configuration, that can be readily rotated by a wrench. This provides a means for a mechanic to engage the injection nozzle 40 during installation and removal. An indicia 68 can be engraved or printed on the nut section 60 to indicate the size of the output orifice 54 on the injection nozzle 40.

The nut section 60 leads into an externally threaded section 61. The externally threaded section 61 extends to the second end 52. The externally threaded section 61 enables the injection nozzle 40 to be threaded into the heated injection barrel 46 of an injection molding machine.

As shown best in FIG. 5, it will be understood that the injection nozzle 40 defines an internal conduit 70 of a complex shape. The internal conduit 70 begins at the output orifice 54 at the first end 50 and extends to the intake orifice 56 at the second end 52. In use, molten thermoplastic material flows into the intake orifice 56 at the second end 52 and is directed toward the output orifice 54 at the first end 50. The internal conduit 70 has two zones. A first zone 72 extends into the internal conduit 70 from the output orifice 54 at the first end 50. A second zone 73 extends into the internal conduit 70 from the intake orifice 56 at the second end 52. The first zone 72 and the second zone 73 meet at a transition area 74 within the internal conduit 70.

The first zone 72 within the internal conduit 70 can be cylindrical in shape or slightly frustum shaped. Regardless, the first zone 72 begins at the output orifice 54 and the diameter of the output orifice 54 is equal to, or greater than, any other part of the first zone 72. The first zone 72 extends to the transition area 74. The distance, as measured along the center axis 48, from the first end 50 to the transition area 74, is equal to or only slightly offset from the distance from the first end 50 to the low point 66 on the exterior of the nozzle body 41. This creates a thin segment 76 of the nozzle body 41 between the low point 66 on the exterior of the nozzle body 41 and the transition area 74 on the internal conduit 22.

The second zone 73 extends between the transition area 74 and the intake orifice 56 at the second end 52. The intake orifice 56 is the widest part of the second zone 73. The second zone 73 tapers down to the diameter of the first zone 72 as the second zone 73 approaches the first zone 72.

Figure 6:
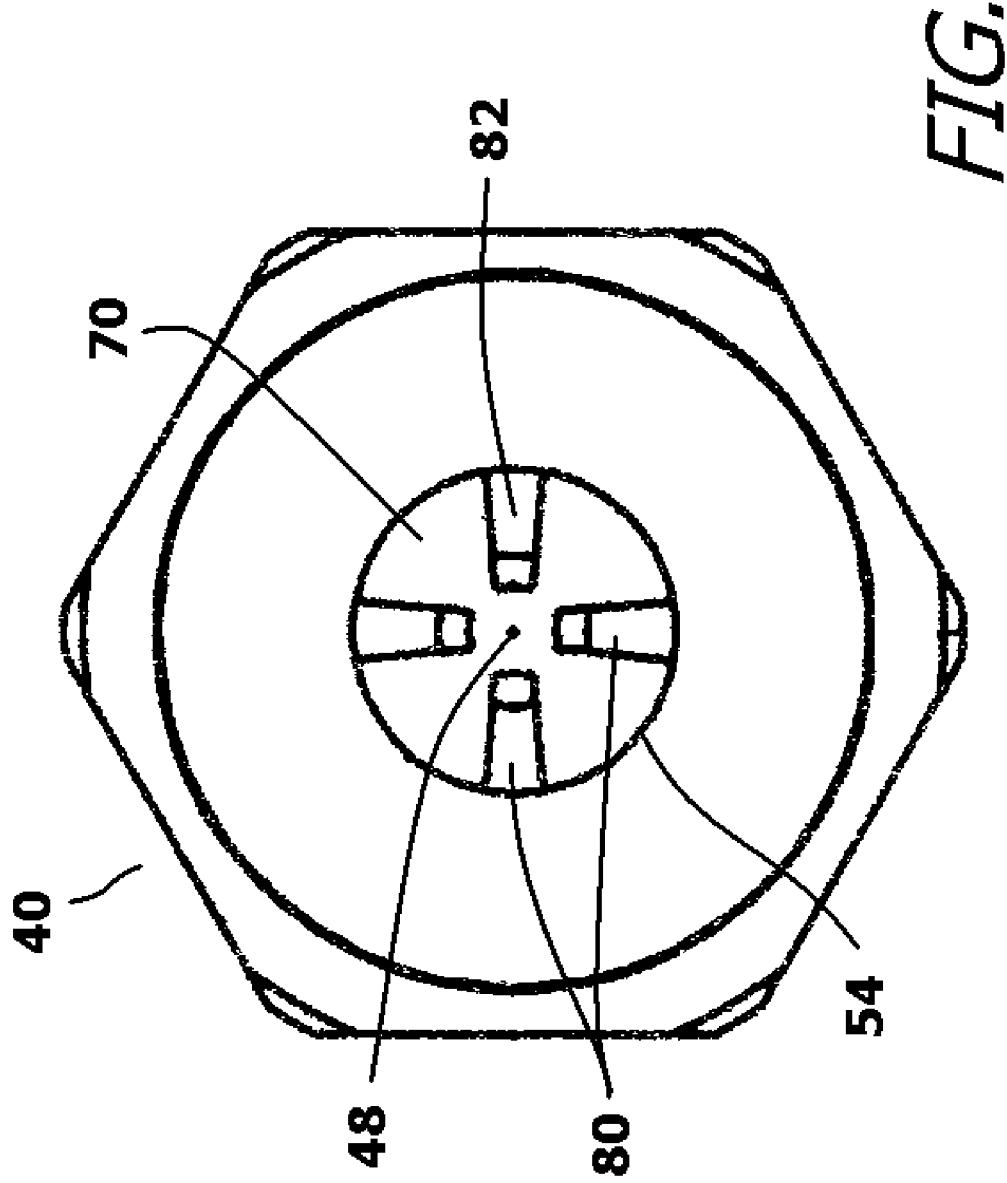
FIG. 6 shows a front view of the exemplary embodiment of FIG. 4.

Referring to FIG. 5 in conjunction with FIG. 6, it can be seen that within the first zone 72 of the internal conduit 70, a plurality of heat transfer fins 80 radially extend toward the center axis 48. In the shown embodiment, four heat transfer fins 80 are shown. However, it should be understood that any plurality of heat transfer fins 80 can be utilized if the space permits. In the shown embodiment, each of the heat transfer fins 80 extends through the first zone 72 of the internal conduit 70 from the first end 50 to the transition area 74. Each of the heat transfer fins 80 has a narrow ridge surface 82 that faces toward the center axis 48. The ridge surface 82 follows a complex path. The ridge surface 82 has three regions. The first region 84 begins at the output orifice 54 and steeply diverges toward the center axis 48 at a first angle of inclination. The first angle of inclination is preferably between twenty degrees and sixty degrees. The first region 84 of the ridge surface 82 bends into a second region 86 that has a reduced second angle of inclination. The second angle of inclination is preferably between two degrees and twenty degrees. The second region 86 of the ridge surface 82 bends into a third region 88. The third region 88 follows a concave curvature until it terminates at the transition area 74 at the start of the second zone 73. The concave curvature of the third regions 88 of the heat transfer fins 80 creates a partial bowl that helps direct molten thermoplastic material through and around the heat transfer fins 80 with a minimum of shear.

Figure 7:
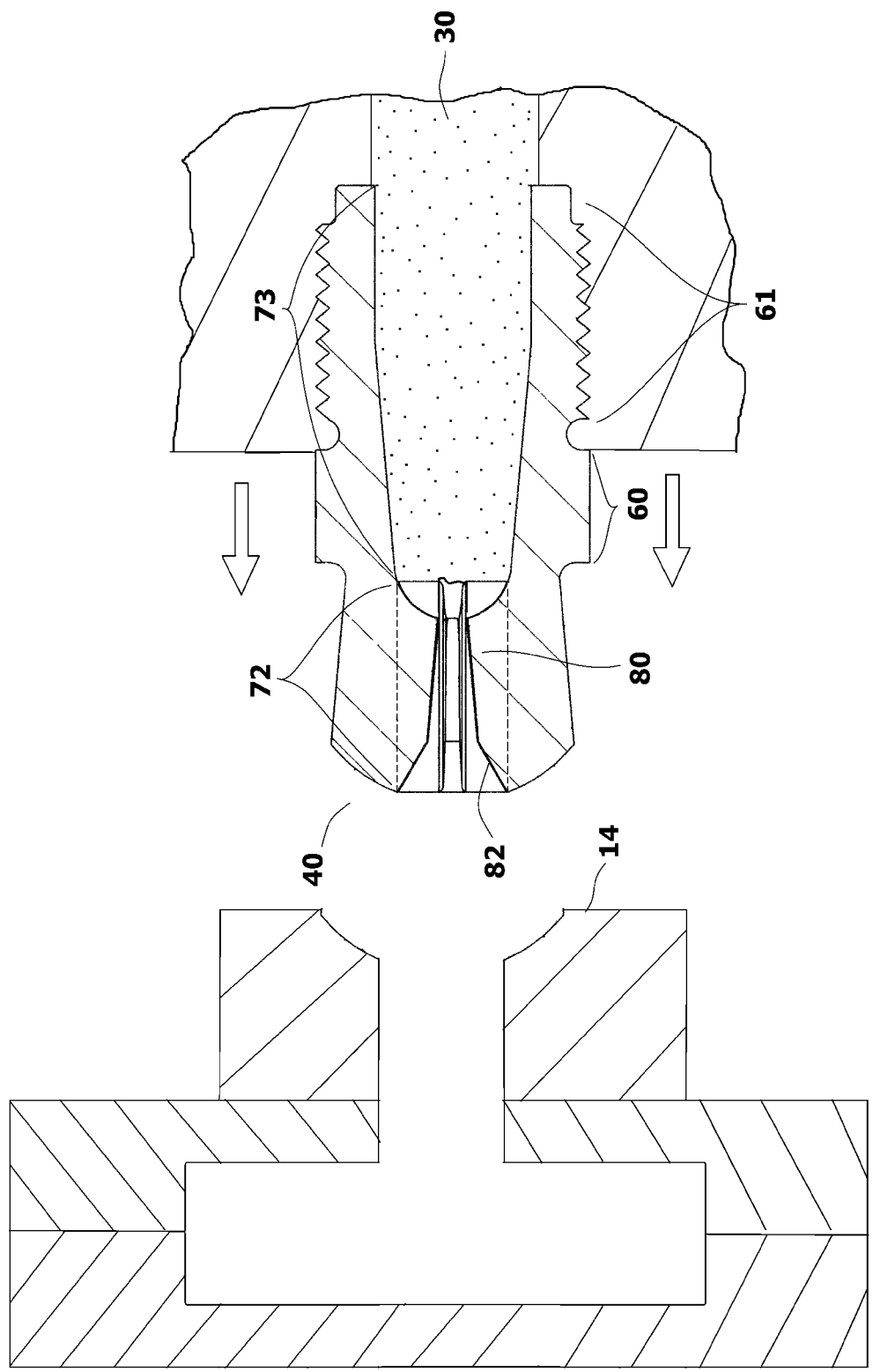
FIG. 7 is a cross-sectional view of an abutment connection within an injection molding machine between an injection nozzle and a sprue bushing, wherein the abutment connection is shown disengaged.
Figure 8:
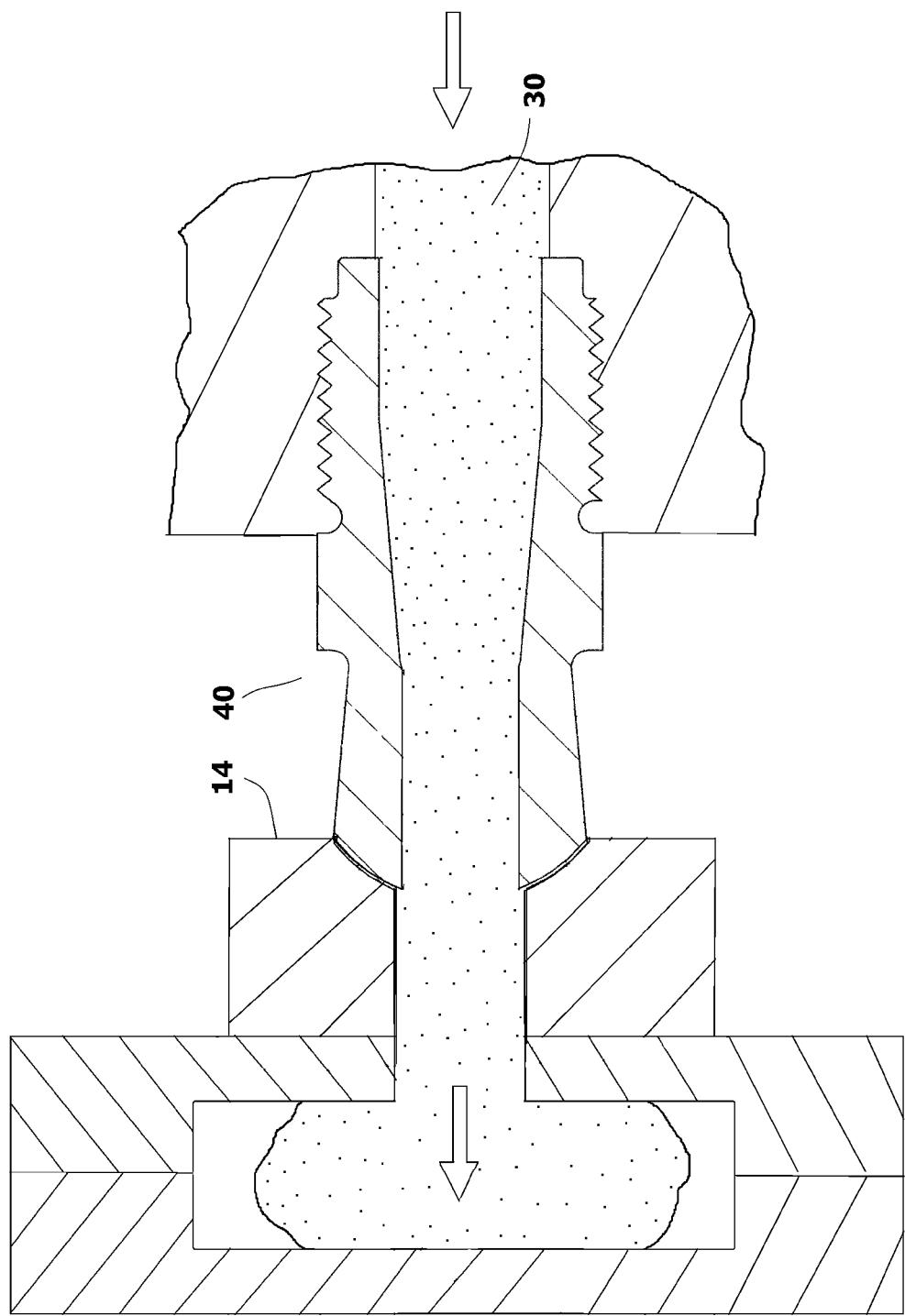
FIG. 8 shows the abutment connection of FIG. 7 shown in the middle of a molding cycle.
Figure 9:
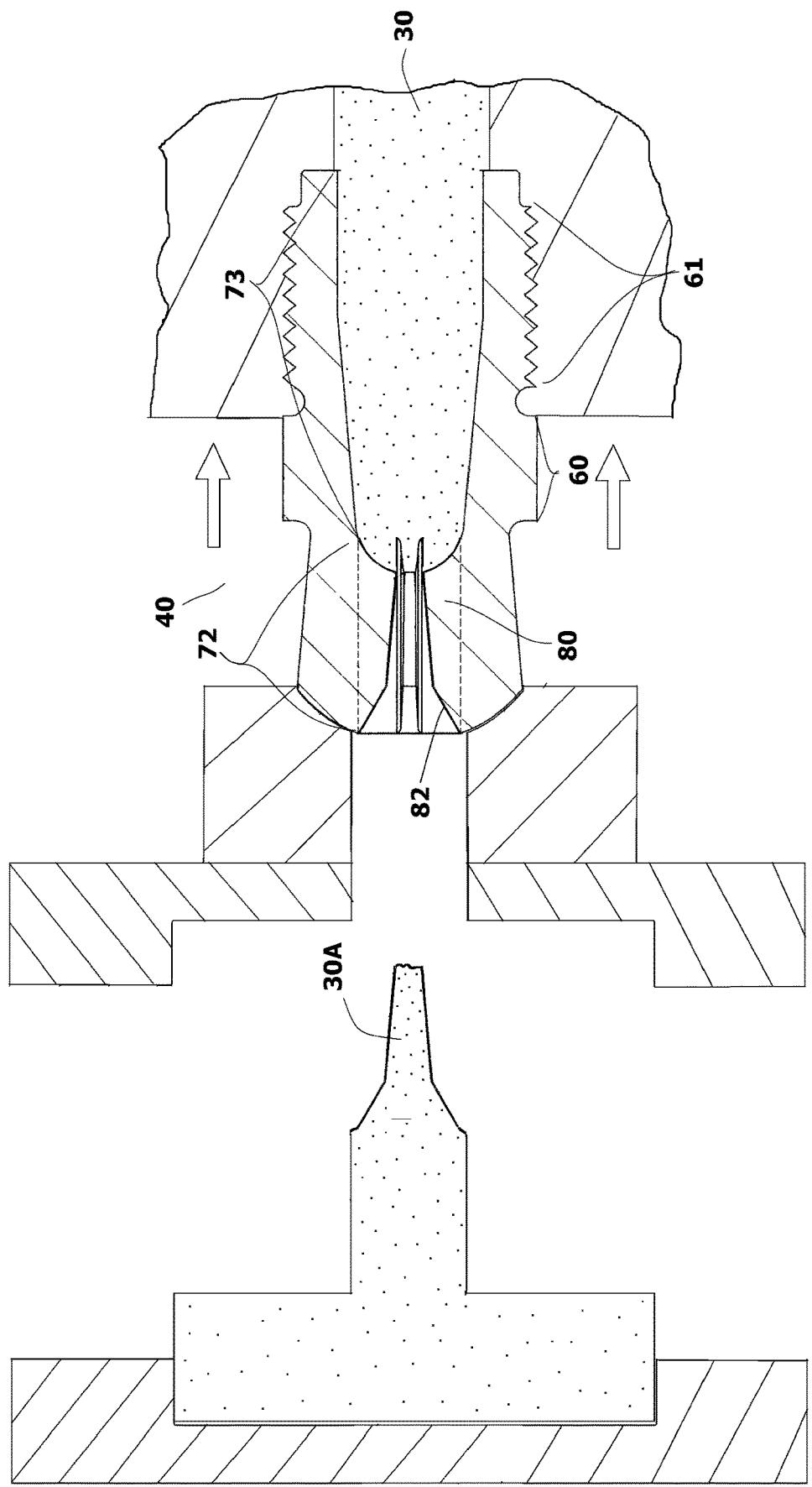
FIG. 9 shows the abutment connection of FIG. 7 shown at the end of a molding cycle.

Referring to FIG. 7, FIG. 8 and FIG. 9 in conjunction with FIG. 5, it will be understood that molten thermoplastic material 30 fills the internal conduit 70 of the injection nozzle 40 as the molten thermoplastic material flows through the injection nozzle 40 and into the sprue bushing 14. At the end of the transfer cycle, there is slight delay before the injection nozzle 40 and the solidified sprue 28 separate. During this slight delay, the molten thermoplastic material 30 in the injection nozzle 40 cools by transferring heat to the nozzle body 41. The nozzle body 41 is cooled by the ambient environment. The transfer of heat from the molten thermoplastic material to the nozzle body 41 is greatly increased by the presence of the heat transfer fins 80. Additionally, since the thermoplastic material 30 flows around the heat transfer fins 80, the heat transfer fins 80 absorb heat from the thermoplastic material 30 throughout most of its cross-sectional profile. This enables the thermoplastic material 30 to cool evenly throughout its cross-sectional profile and have a more uniform temperature at any given point in that profile.

The thermoplastic material 30 is also rapidly cooled by the thinned segment 76 of the nozzle body 41 between the low point 66 on the exterior and the transition area 74 within the internal conduit 70. Conversely, the nut section 60 of the nozzle body 41 has a large mass and the threaded section 61 is heated by the heated injection barrel. As a consequence, the thermoplastic material 30 in the first zone 72 of the internal conduit 70 will cool much faster than the thermoplastic material 30 in the second zone 73. The thermoplastic material 30 in the first zone 72 will therefore harden while the thermoplastic material 30 in the second zone 73 is still molten. The point of transition is designed to occur in the area of the transition area 74.

As shown in FIG. 9, when the solidified sprue 28 separates from the injection nozzle 40, the thermoplastic material 30 within the internal conduit 70 of the injection nozzle 40 separates. The separation occurs between the first zone 72 and the second zone 73, because the thermoplastic material 30 is hardened in the first zone 72 while still molten in the second zone 73. The angles of inclination on the ridge surfaces 82 of the heat transfer fins 80 enable the hardened thermoplastic material 30 to quickly separate from the heat transfer fins 80 without physical binding. Accordingly, the hardened thermoplastic material 30A from the first zone 72 remains attached to the solidified sprue 28 upon separation. The hardened thermoplastic material 30A is cleaned away when the mold opens and the solidified sprue 28 is ejected from the mold.

The advantages of having the thermoplastic material 30 separate at the transition zone 74 is multifold. The separation at this point minimizes the formation of strings. Accordingly, molds will have less string damage and require less maintenance. Furthermore, when the solidified thermoplastic material 30A repeatedly separates from the semi-rigid molding material at the transition area 74, the amount of thermoplastic material, known as "shot size," is more precisely repeatable from cycle to cycle.

Figure 10:
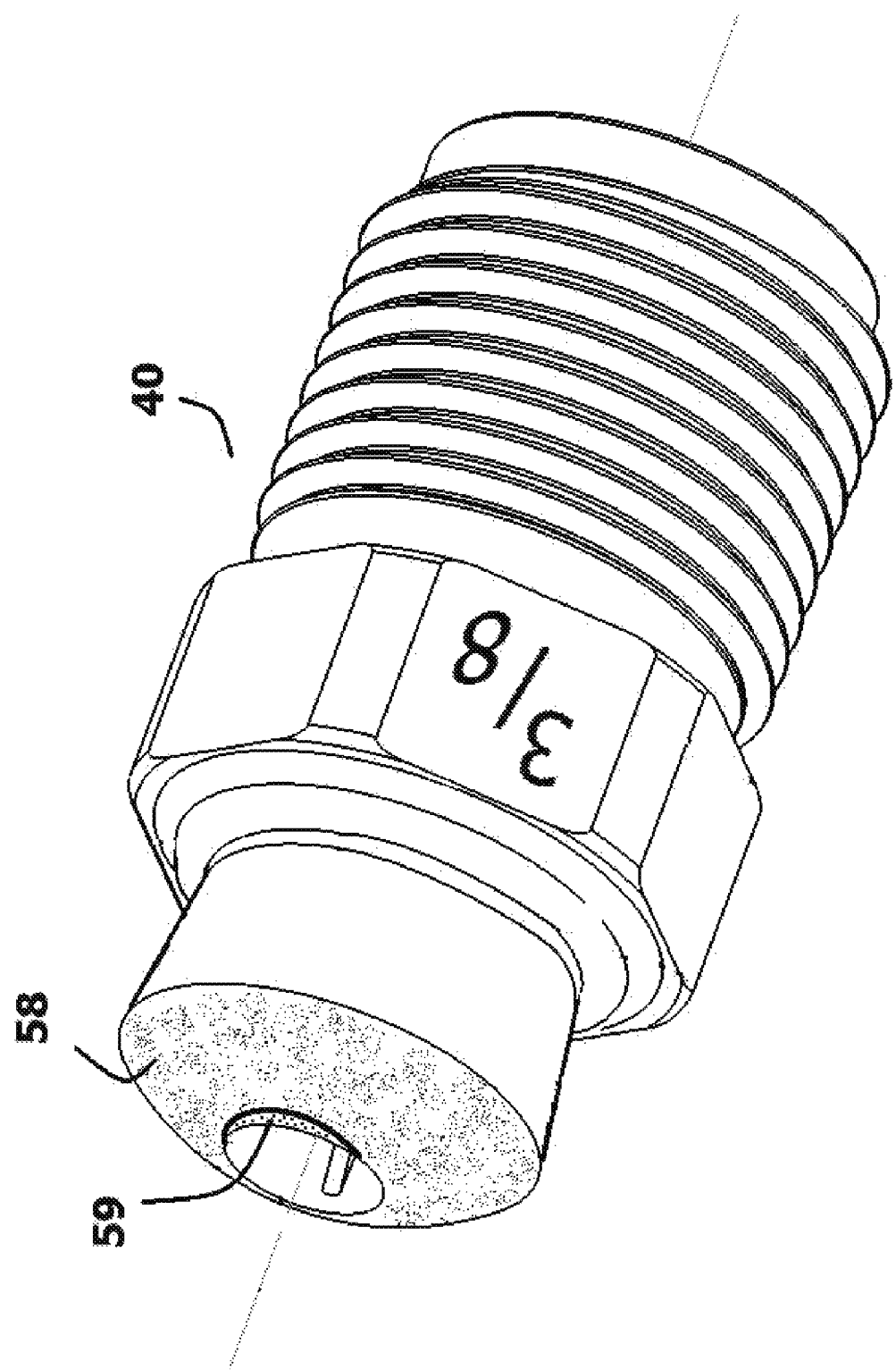
FIG. 10 shows a perspective view of the exemplary embodiment of an injection nozzle with a misaligned sprue bushing.

Referring to FIG. 10 in conjunction with FIG. 8 and FIG. 9, it can be seen that after a molding cycle, the mold operator can observe the curved contact surface 58 of the injection nozzle 40. As has been previously mentioned, the curved contact surface 58 can be textured rather than smooth. The texturing can have patterns of deformations of +/−0.002 inches. In this manner, if the injection nozzle 40 is not perfectly aligned, the misalignment can be visualized by observing any deformation 59 left on the curved contact surface 58. Once the deformation 59 is observed, the mold operator can adjust the alignment to reduce or eliminate any offset.

Figure 11:
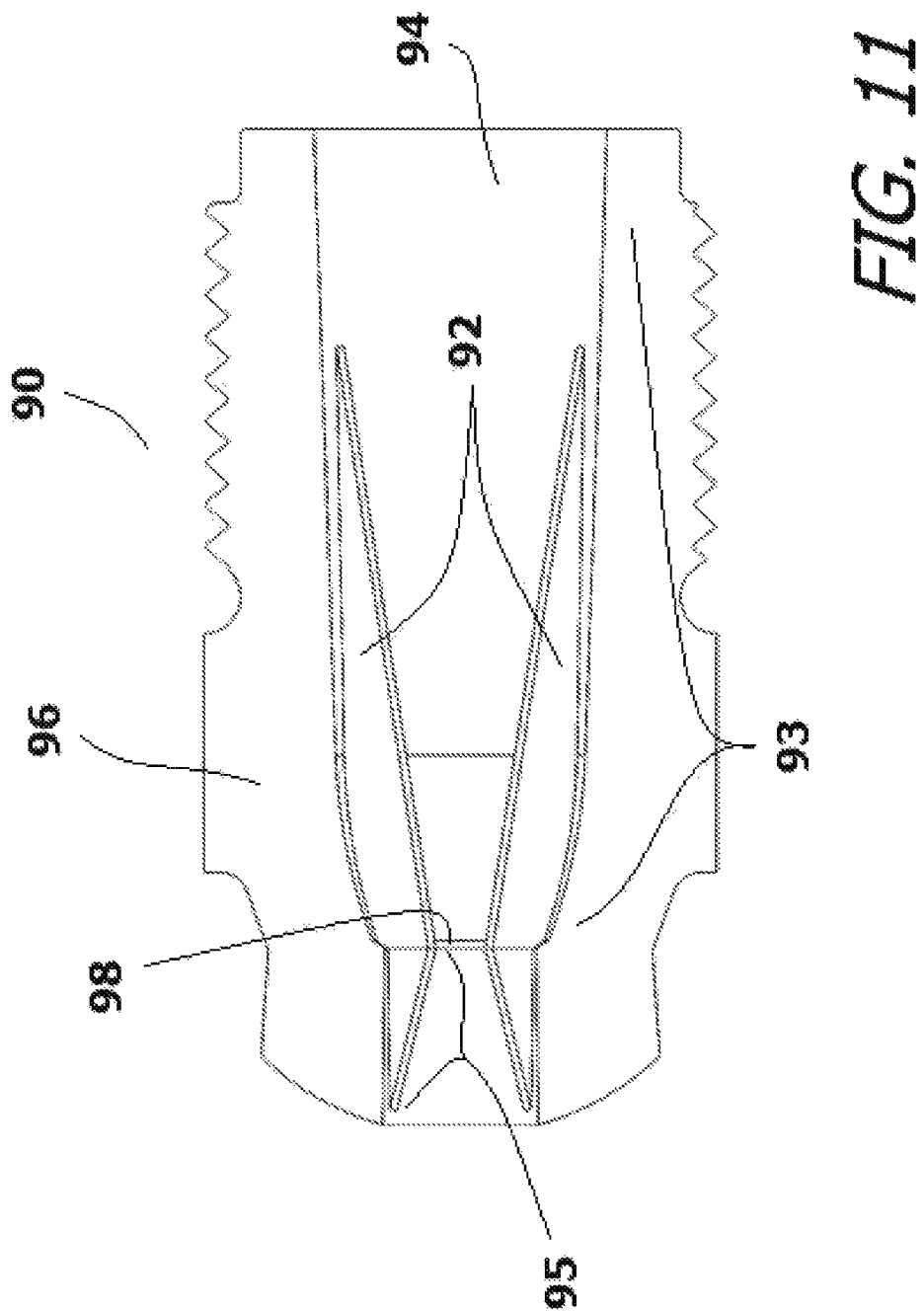
FIG. 11 shows a cross-sectional view of an alternate embodiment of an injection nozzle.

Referring to FIG. 11, an alternate embodiment of an injection nozzle 90 is shown. This embodiment is similar to the earlier presented embodiment, with the added feature of heat conducting fins 92 in the second zone 93 of the internal conduit 94. The exterior of nozzle body 96 surrounding the second zone 93 is in contact with the heated barrel of the injection molding machine. Consequently, the nozzle body 96 surrounding the second zone 93 is heated. Thus, the heat conducting fins 92 transfer heat into the second zone 92 of the internal conduit 94. This helps keep the thermoplastic material within the second zone 93 molten while the thermoplastic material in the first zone 95 hardens.

The heat conducting fins 92 in the second zone 93 slope in different directions than do the heat conducting fins in the first zone 95. The change in slope occurs at a transition area 98 between the first zone 95 and the second zone 93. This helps the thermoplastic material part at the transition area 98.

Figure 12:
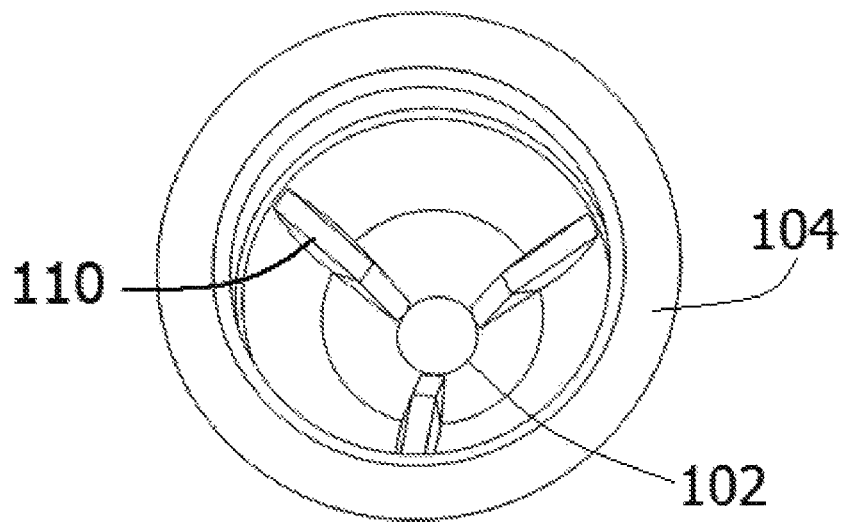
FIG. 12 shows a cross-sectional view of an alternate embodiment of a nozzle.
Figure 13:
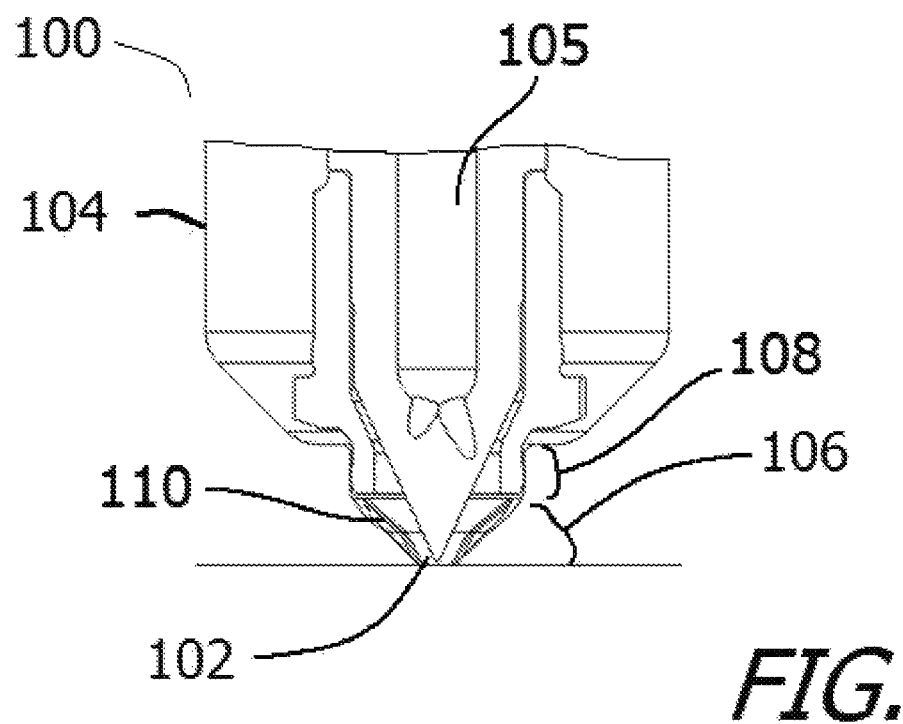
FIG. 13 shows a side view of the mold gate insert assembly of FIG. 12.

The technology of using internal heat transfer fins to control heat and create a consistent separation point between molten and hardened thermoplastic material can be adapted to molding elements other than injection nozzles. Referring to FIG. 12, and FIG. 13, a hot runner nozzle 100 is shown. A hot runner nozzle 100 is a nozzle where the tip does not form part of the gate. In the molding industry, such nozzles are often referred to as "tip-gate" or "bodiless point gate" nozzles. In such a nozzle, a gate or outlet orifice 102 is formed within a separate mold gate insert 104 that is installed in, or on, a cooled mold plate (not shown). As shown, the mold gate insert 104 defines an interior conduit 105 having a first zone 106 and a second zone 108. Heat conducting fins 110 are provided in the first zone 106. The heat conducting fins 110 draw heat from the thermoplastic material and transfers the heat into the cooler adjoining gate insert 104 or mold plate. Accordingly, each of the fins 110 act as a heat sink in this manner. This would allow such a nozzle 100 to be provided with a larger output orifice 102 than is typical, while avoiding the formation of strings or a tall gate vestige.

The point gate design could be provided with many of the injection nozzle features shown and described herein, and a person of ordinary skill in the art would be capable of adapting such features for incorporation into a point gate type of nozzle.

It will be understood that the embodiments of the present invention that are illustrated and described are merely exemplary and that a person skilled in the art can make many variations to those embodiments. For instance, the nozzle assembly can be configured in different shapes and sizes to meet the needs of different molding machines. All such embodiments are intended to be included within the scope of the present invention as defined by the claims.

What is claimed is:

1. An injection nozzle for use in an injection molding machine, said injection nozzle comprising:
    a nozzle body having a first end and an opposite second end, wherein said nozzle body is symmetrically disposed around a center axis that extends through said first end and said second end, wherein said nozzle body has a tip section, a nut section, and a threaded section that is interposed between said first end and said second end;
    an output orifice of a first diameter disposed at said first end of said body, wherein said output orifice is concentric with said center axis;
    an intake orifice of a second diameter disposed at said second end of said body, wherein said second diameter is larger than said first diameter of said output orifice, and wherein said intake orifice is concentric with said center axis;
    a conduit that extends through said nozzle body between said intake orifice and said output orifice, said conduit having a first zone that extends into said nozzle body from said output orifice and a second zone that extends from said first zone to said second end; and
    a plurality of fins that radially extend into said first zone of said conduit toward said center axis from said nozzle body, wherein said plurality of fins are configured to conduct heat from said first zone of said conduit into said nozzle body, wherein each of said plurality of fins has a ridge surface that faces said center axis.

2. The injection nozzle according to claim 1, wherein said first zone of said conduit has a length and has an internal diameter equal to said first diameter of said output orifice along said length.

3. The injection nozzle according to claim 1, wherein said first zone has internal diameters no greater than said first diameter of said output orifice.

4. The injection nozzle according to claim 1, wherein each said ridge surface has a first region that is positioned at a first angle of inclination relative said center axis.

5. The injection nozzle according to claim 4, wherein said first angle of inclination is between twenty degrees and sixty degrees.

6. The injection nozzle according to claim 4, wherein said first region of each said ridge surface begins within said first zone of said conduit and extends toward said second zone.

7. The injection nozzle according to claim 4, wherein ridge surface of each said plurality of fins has a second section that has a second angle of inclination relative said center axis, wherein said second angle of inclination is less than said first angle of inclination.

8. The injection nozzle according to claim 7, wherein said second angle inclination is between two degrees and ten degrees.

9. The injection nozzle according to claim 7, wherein ridge surface of each said plurality of fins has a third section that follows a concave curvature.

10. The injection nozzle according to claim 1, wherein said plurality of fins are present only in said first zone of said conduit.

11. The injection nozzle according to claim 1, wherein said plurality of fins extends from said first zone into said second zone.

12. The injection nozzle according to claim 11, wherein each said ridge surface has a slope that changes as said ridge surface passes from said first zone to said second zone.

13. The injection nozzle according to claim 1, wherein said first zone of said conduit meets said second zone of said conduit at a transition area in said conduit that is perpendicular to said center axis.

14. The injection nozzle according to claim 13, wherein said tip section of said nozzle body has an exterior that tapers to a minimum in an area that surrounds said transition area within said conduit.

15. The injection nozzle according to claim 1, wherein said nozzle body has a curved surface that extends from said output orifice to said tip section, wherein said curved surface is textured.

16. An injection nozzle for use in an injection molding machine, said injection nozzle comprising:
- a nozzle body having a first end and an opposite second end, wherein said nozzle body is symmetrically disposed around a center axis that extends through said first end and said second end, and wherein said nozzle body has a tip section, a nut section, and a threaded section that is interposed between said first end and said second end;
- an output orifice disposed at said first end of said body, wherein said output orifice is concentric with said center axis;
- an intake orifice disposed at said second end of said body, wherein said intake orifice is concentric with said center axis;
- a conduit that extends through said nozzle body between said intake orifice and said output orifice, said conduit having a first zone that extends into said nozzle body from said output orifice and a second zone that extends from said first zone to said second end, wherein said first zone and said second zone meet at a transition area within said conduit;
- wherein said tip section of said nozzle body has an exterior that tapers from said first end to a minimum in an area that surrounds said transition area of said conduit; and
- a plurality of fins that radially extend into said first zone of said conduit toward said center axis from said nozzle body, wherein said plurality of fins are configured to conduct heat from said first zone of said conduit into said nozzle body, wherein each of said plurality of fins has a ridge surface that faces said center axis.

\* \* \* \* \*